(12) United States Patent
Behue et al.

(10) Patent No.: US 6,894,127 B2
(45) Date of Patent: May 17, 2005

(54) POLYMERIZATION PROCESS

(75) Inventors: Patrick Daniel Yves Behue, Istres (FR); Gacem Benazzouz, Edinburgh (GB); Laurent Coupier, Sausset les Pins (FR); David Heslop, Istres (FR); Sebastien Huchette, Martigues (FR); Jean-Pierre Isnard, Martigues (FR); Willy Lemesle, Martigues (FR); Renaud Viguier, Sete (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/416,803

(22) PCT Filed: Nov. 14, 2001

(86) PCT No.: PCT/GB01/05027

§ 371 (c)(1),
(2), (4) Date: Oct. 21, 2003

(87) PCT Pub. No.: WO02/40554

PCT Pub. Date: May 23, 2002

(65) Prior Publication Data

US 2004/0063878 A1 Apr. 1, 2004

(30) Foreign Application Priority Data

Nov. 16, 2000 (GB) .............................................. 0027990

(51) Int. Cl.[7] .................................................. C08F 4/40

(52) U.S. Cl. ........................... 526/90; 526/201; 526/901
(58) Field of Search ............................ 526/901, 90, 201

(56) References Cited

U.S. PATENT DOCUMENTS

| | | | |
|---|---|---|---|
| 5,026,795 A | | 6/1991 | Hogan |
| 5,405,922 A | * | 4/1995 | DeChellis et al. ............ 526/68 |
| 5,733,988 A | | 3/1998 | Apecetche et al. |
| 5,773,567 A | * | 6/1998 | Emert et al. ................. 528/392 |
| 6,022,935 A | * | 2/2000 | Fischer et al. ............... 526/129 |
| 6,562,924 B2 | | 5/2003 | Benazouzz et al. ......... 526/201 |
| 6,639,028 B2 | | 10/2003 | Heslop et al. ............... 526/106 |
| 6,646,074 B2 | | 11/2003 | Herzog et al. ............... 526/152 |

FOREIGN PATENT DOCUMENTS

| | | |
|---|---|---|
| EP | 0 453 116 A1 | 10/1991 |
| EP | 0924 223 A2 | 6/1999 |
| WO | WO 00/58373 | 10/2000 |
| WO | WO 00/68274 | 11/2000 |
| WO | WO 01/18066 | 3/2001 |

* cited by examiner

*Primary Examiner*—William K. Cheung
(74) *Attorney, Agent, or Firm*—Finnegan, Henderson, Farabow, Garrett and Dunner, L.L.P.

(57) ABSTRACT

The present invention relates to a process for the gas-phase (co-)polymerization of olefins in a fluidised bed reactor using a late transition metal catalyst characterised in that the polymerization is performed in the presence of a process aid additive.

20 Claims, 2 Drawing Sheets

POLYMERIZATION PROCESS

BACKGROUND OF THE INVENTION

The present invention relates to a process for the gas-phase (co-)polymerisation of olefins, more particularly in a fluidised bed reactor.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed starts to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

Amongst the catalysts known for polymerisation or copolymerisation of olefins are late transition metal catalyst the s. Late transition metal complexes such as those disclosed in WO 96/23010 or WO 99/12981 are particularly effective. By "late transition metal" is meant a metal from Groups VIIIb or Ib (Groups 8–11) of the Periodic Table. In particular the metals Fe, Co, Ni, Ru, Rb, Pd, Os, Ir, and Pt are preferred, especially Fe, Co and Ni.

However with all catalysts there is always the potential for fouling in gas phase polymerisation processes. Non uniform fluidisation, poor heat transfer in the polymerisation process and activity kinetic profile can all contribute to such problems. Such fouling often manifests itself in the form of "cold bands" in the temperature profile of the reactor, showing areas where the polymer has formed a film on the reactor surface. Elimination of such cold bands is therefore desirable. There is thus a need in the art to find a process for producing polyolefins on gas phase industrial plants using late transition metal catalysts in which the degree of fouling is reduced or eliminated.

Our own copending unpublished application WO GB00/01690 discloses that a process aid additive selected from at least one of (1) a polysulfone copolymer, (2) a polymeric polyamine, and (3) an oil-soluble sulfonic acid can alleviate the above-mentioned problems.

SUMMARY OF THE INVENTION

We have now unexpectedly found that the above process aid additive is also very effective in alleviating the above-mentioned problems when polymerising using a late transition metal catalyst.

The present invention provides a process for the gas-phase (co-)polymerisation of olefins in a fluidised bed reactor using a late transition metal catalyst in the presence of a process aid additive, characterised in that the additive comprises at least one of the following:

(1) a polysulfone copolymer, (2) a polymeric polyamine, and (3) an oil-soluble sulfonic acid.

Preferably, the process aid additive comprises at least two components selected from above components (1), (2) and (3). More preferably, the process aid additive comprises a mixture of (1), (2) and (3).

In accordance with the present invention, there is also provided a process for preventing fouling during the gas-phase (co-)polymerisation of olefins in a fluidised bed reactor using a late transition metal catalyst in the presence of a process aid additive characterised in that the additive comprises a mixture of (1) a polysulfone copolymer, (2) a polymeric polyamine, and (3) an oil-soluble sulfonic acid.

In accordance with the present invention, there is further provided a process for improving the flowability of the polymer and/or the fluidisation characteristics of the polymer during the gas-phase (co-)polymerisation of olefins in a fluidised bed reactor using a late transition metal catalyst in the presence of a process aid additive characterised in that the additive comprises a mixture of (1) a polysulfone copolymer, (2) a polymeric polyamine, and (3) an oil-soluble sulfonic acid.

The present invention also provides in a further aspect the use of the above process aid additive to prevent fouling and/or to improve flowability and/or reduce temperature discontinuities around the surface of the reactor during the gas-phase (co-) polymerisation of olefins in a fluidised bed reactor using a late transition metal catalyst.

While not wishing to be bound to the following explanation, it is believed that flowability of the polymer and/or fluidisation characteristics of the polymer are highly critical for running late transition metal catalysts in the gas phase polymerisation of olefins.

Consequently, the present invention also relates to an ethylene (co)polymer obtainable by the process of the present invention, i.e. a gas-phase (co-)polymerisation process of ethylene in a fluidised bed reactor using a late transition metal catalyst in the presence of a process aid additive characterised in that the additive comprises a mixture of (1) a polysulfone copolymer, (2) a polymeric polyamine, and (3) an oil-soluble sulfonic acid.

DETAILED DESCRIPTION OF THE INVENTION

Figure 1:
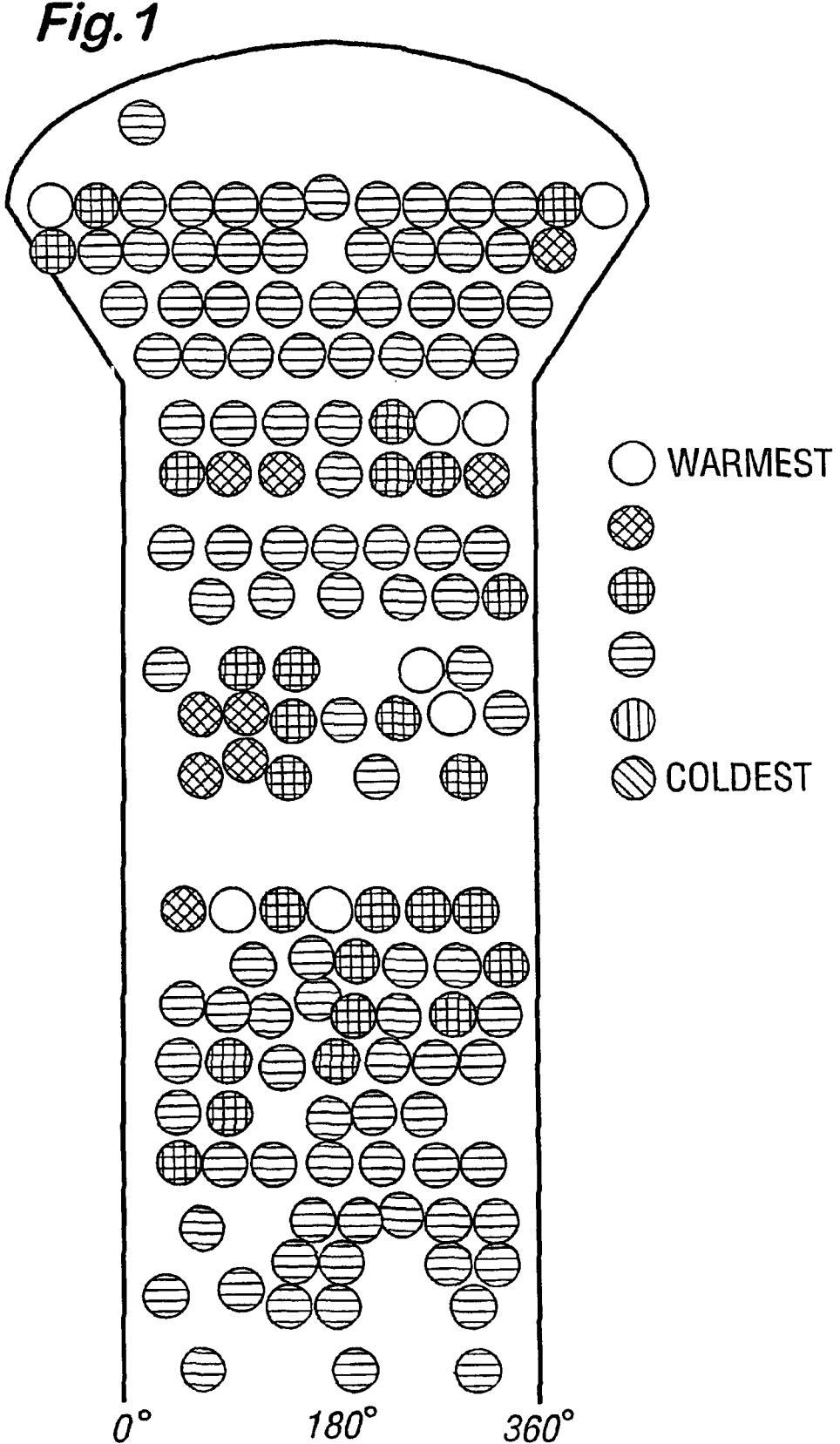
FIG. 1 shows the appearance of a cold band extending around the base of a reactor, together with some cooler areas at the top of the reactor.

The process aid additive can be added at any location of the fluidised bed polymerisation system, e.g. in the reactor itself, below the fluidisation grid or above the grid in the fluidised bed, above the fluidised bed, in the powder disengagement zone of the reactor, anywhere in the reaction loop or recycle line, in the fines recycle line (when a fines separator, preferably a cyclone, is used) etc. According to a preferred embodiment of the present invention, the process aid additive is directly added into the fines recycle line (when a fines separator, preferably a cyclone, is used) or directly into the polymerisation zone, more preferably directly into the fluidised bed, ideally into the lower part of the bed (below half bed height). For the purposes of the present invention and appended claims, the polymerisation zone means the reaction zone consisting of the fluidised bed itself, and the region above the fluidised bed which consists of the powder disengagement zone and/or the velocity reduction zone. The process aid additive is preferably directly added into the fluidised bed polymerisation reaction zone. It is also particularly preferred according to the present invention that the process aid additive is not added in admixture with a catalyst component like the catalyst itself or the cocatalyst. According to another preferred embodiment, the process aid additive is added into the fluidised bed polymerisation system through the well known BP high productivity nozzles which protrude through the fluidisation grid directly into the fluidised bed (see e.g. WO 94/28032, the content of which is incorporated hereby by reference).

The polysulfone copolymer component of the process aid additive (often designated as olefin-sulfur dioxide copolymer, olefin polysulfones, or poly(olefin sulfone)) is a polymer, preferably a linear polymer, wherein the structure is considered to be that of alternating copolymers of the olefins and sulfur dioxide, having a one-to-one molar ratio of the comonomers with the olefins in head to tail arrangement. Preferably, the polysulfone copolymer comprises about 50 mole percent of units of sulfur dioxide, about 40 to 50 mole percent of units derived from one or more 1-alkenes each having from about 6 to 24 carbon atoms, and from about 0 to 10 mole percent of units derived from an olefinic compound having the formula ACH=CHB where A is a group having the formula —($C_xH_{2x}$)—COOH wherein x is from 0 to about 17, and B is hydrogen or carboxyl, with the proviso that when B is carboxyl, x is 0, and wherein A and B together can be a dicarboxylic anhydride group.

Preferably, the polysulphone copolymer employed in the present invention has a weight average molecular weight in the range 10,000 to 1,500,000, preferably in the range 50,000 to 900,000. The units derived from the one of more 1-alkenes are preferably derived from straight chain alkenes having 6–18 carbon atoms, for example 1-hexene, 1-heptene, 1-octene, 1-decene, 1-dodecene, 1-hexadecene and 1-octadecene. Examples of units derived from the one or more compounds having the formula ACH=CHB are units derived from maleic acid, acrylic acid, 5-hexenoic acid. For further details of polysulphones particularly suitable for use in the present invention reference may be made to GB 1432265A, GB 1432266 A, and U.S. Pat. No. 3,811,848 and U.S. Pat. No. 3,917,466.

A preferred polysulfone copolymer is 1-decene polysulfone having an inherent viscosity (measured as a 0.5 weight percent solution in toluene at 30° C.) ranging from about 0.04 dl/g to 1.6 dl/g.

The polymeric polyamine component of the process aid additive is preferably a polymeric polyamine having the general formula:

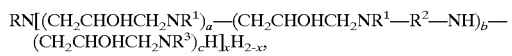

$RN[(CH_2CHOHCH_2NR^1)_a$—$(CH_2CHOHCH_2NR^1$—$R^2$—$NH)_b$—$(CH_2CHOHCH_2NR^3)_c H]_x H_{2-x}$, wherein $R^1$ is an aliphatic hydrocarbyl group of 8 to 24 carbon atoms, $R^2$ is an alkylene group of 2 to 6 carbon atoms, $R^3$ is the group —$R^2$—$HNR^1$, R is $R^1$ or an N-aliphatic hydrocarbyl alkylene group having the formula $R^1NHR^2$—;

a, b and c are integers of 0–20 and x is 1 or 2; with the proviso that when R is $R^1$ then a is an integer of 2 to 20 and b=c=0, and when R is $R^1NHR^2$— then a is 0 and b+c is an integer of 2 to 20.

The polymeric polyamines which can be suitably employed in the process of the present invention are described in U.S. Pat. No. 3,917,466, in particular at column 6 line 42 to column 9 line 29.

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, eg a mixture of xylene and isopropanol, adding a strong base, eg sodium hydroxide and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo 130" sold by Universal Oil Company.

The oil-soluble sulfonic acid component of the process aid additive is preferably any oil-soluble sulfonic acid such as an alkanesulfonic acid or an alkylarylsulfonic acid. A useful sulfonic acid is petroleum sulfonic acid resulting from treating oils with sulfuric acid.

Preferred oil-soluble sulfonic acids are dodecylbenzenesulfonic acid and dinonylnaphthylsulfonic acid.

The process aid additive preferably comprises 1 to 25 weight percent of the polysulfone copolymer, 1 to 25 weight percent of the polymeric polyamine, 1 to 25 weight percent of the oil-soluble sulfonic acid and 25 to 95 weight percent of a solvent. Neglecting the solvent, the process aid additive preferably comprises about 5–70 weight percent polysulfone copolymer, 5–70 weight percent polymeric polyamine, and 5–70 weight percent oil-soluble sulfonic acid; the total of course being 100 percent.

Suitable solvents include aromatic, paraffin and cycloparaffin compounds. The solvents are preferably selected from among benzene, toluene, xylene, cyclohexane, fuel oil, isobutane, kerosene and mixtures thereof for instance.

According to a preferred embodiment of the present invention, the process aid additive is diluted in a conventional hydrocarbon diluent which can be the same or different than the above solvent, and which is preferably butane, pentane or hexane.

When a diluent is used, the process aid additive is preferably present in an amount comprised between 0.5 and 500 g/l of diluent, preferably between 5 and 200 g/l of diluent.

According to a preferred embodiment of the present invention, the total weight of components (1), (2), (3), the solvent and the diluent represents essentially 100% of the weight of the process aid additive.

One useful composition, for example, consists of 13.3 weight percent 1:1 copolymer of 1-decene and sulfur dioxide having an inherent viscosity of 0.05 determined as above, 13.3 weight percent of "Polyflo 130" (1:1.5 mole ratio reaction product of N-tallow-1,3-diaminopropane with epichlorohydrin), 7.4 weight percent of either dodecylbenzylsulfonic acid or dinonylnaphthylsulfonic acid, and 66 weight percent of an aromatic solvent which is preferably toluene or kerosene.

Another useful composition, for example, consists of 2 to 7 weight percent 1:1 copolymer of 1-decene and sulfur dioxide having an inherent viscosity of 0.05 determined as above, 2 to 7 weight percent of "Polyflo 130" (1:1.5 mole ratio reaction product of N-tallow-1,3-diaminopropane with epichlorohydrin), 2 to 8 weight percent of either dodecylbenzylsulfonic acid or dinonylnaphthylsulfonic acid, and 78 to 94 weight percent of an aromatic solvent which is preferably a mixture of 10 to 20 weight percent toluene and 62 to 77 weight percent kerosene.

The additive composition of the present invention (including the solvent therefor) is preferably added to the reactor in an amount ranging from about 1 to about 200 ppm, more preferably from about 10 to about 150 ppm, more preferably from about 10 to about 100 ppm, based on the weight of the olefin introduced into the reactor.

Based on the total weight of just the polysulfone polymer, polymeric amine and oil-soluble sulfonic acid, the preferred concentration of the aid additive is about 0.3 to about 70, preferably about 0.9 to about 35 parts by weight per million parts by weight of the olefin introduced into the reactor.

The process aid additive can be added continuously or intermittently to the reactor. In the continuous gas phase polymerisation process according to the present invention, it is preferred to continuously add the additive to the reactor. Sufficient process aid additive is added to maintain its concentration at the desired level.

According to a preferred embodiment of the present invention, before the late transition metal catalyst is introduced into the reactor, the reactor is pre-loaded with the said process aid additive. This pre-load can be done before or after the introduction of the seed bed polymer into the reactor; however, it is preferred to perform the pre-load solely on the seed bed polymer.

For the pre-load, the additive composition of the present invention (including the solvent therefor) is preferably added to the reactor in an amount ranging from about 2 to about 100 ppm, more preferably from about 5 to about 50 ppm, based on the weight of the seed polymer bed.

Based on the total weight of just the polysulfone polymer, polymeric amine and oil-soluble sulfonic acid, the preferred concentration of the aid additive is about 0.1 to about 35, preferably about 0.5 to about 20 parts by weight per million parts by weight of the seed polymer bed.

According to a preferred embodiment of the present invention, the process aid additive is a material sold by Octel under the trade name STADIS, preferably STADIS 450, more preferably STADIS 425.

The process according to the present invention is suitable for the manufacture of polymers in a continuous gas fluidised bed process.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4–C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4–C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as $C_4$–$C_8$ alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used and the polymer properties desired.

The polymerisation is preferably carried out continuously in a vertical fluidised bed reactor according to techniques known in themselves and in equipment such as that described in European patent application EP 855411A, FR 2207145A or FR 2335526A. The process of the invention is particularly well suited to industrial-scale reactors of very large size.

The catalysts used in the present invention include those disclosed in WO 96/23010 or WO 99/12981. Particularly preferred catalysts are those of Formula (I)

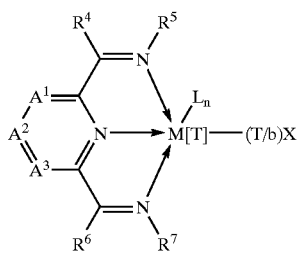

Formula (I)

wherein M is Fe[II], Fe[III], Co[II], Co[III], Ni[II], Rh[II], Rh[III], Ru[II], Ru[III], Ru[IV] or Pd[II]; X represents an atom or group covalently or ionically bonded to the transition metal M; T is the oxidation state of the transition metal M and b is the valency of the atom or group X; L is a group datively bound to M, and n is from 0 to 5; $A^1$ to $A^3$ are each independently N or P or CR, with the proviso that at least one is CR; and $R^4$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl and substituted heterohydrocarbyl.

In the complexes of Formula (I) it is preferred that $A^1$ to $A^3$ are each independently CR where each R is as defined above. In alternative preferred embodiments, $A^1$ and $A^3$ are both N and $A^2$ is CR, or one of $A^1$ to $A^3$ is N and the others are independently CR.

The group L may be an ether such as tetrahydrofuran or diethylether, and alcohol such as ethanol or butanol, a primary, secondary or tertiary amine, or a phosphine.

Preferred catalysts based on complexes of the Formula (I) comprise a complex having the formula (II)

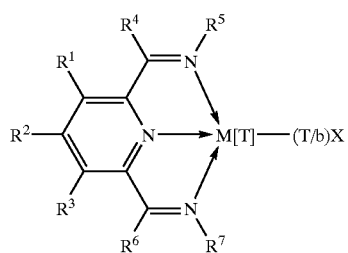

Formula (II)

wherein $R^1$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl, substituted heterohydrocarbyl.

$R^5$ and $R^7$ are preferably independently selected from substituted or unsubstituted alicyclic, heterocyclic or aromatic groups, for example, phenyl, 1-naphthyl, 2-naphthyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6-trimethylphenyl, 2,6-trifluoromethylphenyl, 4-bromo-2,6-dimethylphenyl, 3,5 dichloro2,6-diethylphenyl, and 2,6,bis (2,6-dimethylphenyl)phenyl, cyclohexyl and pyridinyl.

In a preferred embodiment $R^5$ is represented by the group "P" and $R^7$ is represented by the group "Q" as follows:

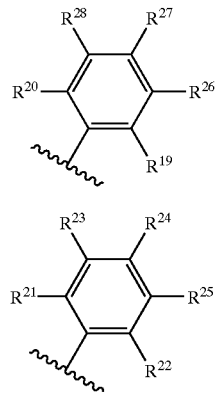

Group P

Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

The ring systems P and Q are preferably independently 2,6-hydrocarbylphenyl or fused-ring polyaromatic, for example, 1-naphthyl, 2-naphthyl, 1-phenanthrenyl and 8-quinolinyl.

Preferably at least one of $R^{19}$, $R^{20}$, $R^{21}$ and $R^{22}$ is hydrocarbyl, substituted hydrocarbyl, heterohydrocarbyl or substituted heterohydrocarbyl. More preferably at least one of $R^{19}$ and $R^{20}$, and at least one of $R^{21}$ and $R^{22}$, is hydrocarbyl, substituted hydrocarbyl, heterohydrocarbyl or substituted heterohydrocarbyl. Most preferably $R^{19}$, $R^{20}$, $R^{21}$ and $R^{22}$ are all independently selected from hydrocarbyl, substituted hydrocarbyl, heterohydrocarbyl or substituted heterohydrocarbyl. $R^{19}$, $R^{20}$, $R^{21}$ and $R^{22}$ are preferably independently selected from methyl, ethyl, n-propyl, iso-propyl, n-butyl, sec-butyl, tert.-butyl, n-pentyl, neopentyl, n-hexyl, 4-methylpentyl, n-octyl, phenyl and benzyl.

$R^1$, $R^2$, $R^3$, $R^4$, $R^6$, $R^{19}$, $R^{20}$, $R^{21}$, $R^{22}$, $R^{23}$, $R^{25}$, $R^{26}$ and $R^{28}$ are preferably independently selected from hydrogen and $C_1$ to $C_8$ hydrocarbyl, for example, methyl, ethyl, n-propyl, n-butyl, t-butyl, n-hexyl, n-octyl, phenyl and benzyl.

In an alternative embodiment $R^5$ is a group having the formula $-NR^{29}R^{30}$ and $R^7$ is a group having the formula $-NR^{31}R^{32}$, wherein $R^{29}$ to $R^{32}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{29}$ to $R^{32}$ are hydrocarbyl, substituted hydrocarbyl, heterohydrocarbyl or substituted heterohydrocarbyl, said two or more can be linked to form one or more cyclic substituents.

Each of the atoms nitrogen atoms is coordinated to the metal by a "dative" bond, ie a bond formed by donation of a lone pair of electrons from the nitrogen atom. The remaining bonds on each of these atoms are covalent bonds formed by electron sharing between the atoms and the organic ligand as shown in the defined formula for the metal complex illustrated above.

The atom or group represented by X in the compounds of Formula (I) and (II) can be, for example, selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide; for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

Preferred metals M in the complexes of Formula (I) are Fe and Co.

The complexes of formula (I) are generally used as catalysts in conjunction with activator compounds. Examples of such activator compounds include organoaluminium compounds and hydrocarbylboron compounds. Suitable organoaluminium compounds include compounds of the formula $AlR_3$, where each R is independently $C_1$–$C_{12}$ alkyl or halo. Examples include trimethylaluminium (TMA), triethylaluminium (TEA), tri-isobutylaluminium (TIBA), tri-n-octylaluminium, methylaluminium dichloride, ethylaluminium dichloride, dimethylaluminium chloride, diethylaluminium chloride, ethylaluminiumsesquichloride, methylaluminiumsesquichloride, and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear and cyclic compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups. Alkylalumoxanes such as methylalumoxane (MAO) are preferred.

Mixtures of alkylalumoxanes and trialkylaluminium compounds are particularly preferred, such as MAO with TMA or TIBA. In this context it should be noted that the term "alkylalumoxane" as used in this specification includes alkylalumoxanes available commercially which may contain a proportion, typically about 10 wt %, but optionally up to 50 wt %, of the corresponding trialkylaluminium; for instance, commercial MAO usually contains approximately 10 wt % trimethylaluminium (TMA), whilst commercial MMAO contains both TMA and TIBA. Quantities of alkylalumoxane quoted herein include such trialkylaluminium impurities, and accordingly quantities of trialkylaluminium compounds quoted herein are considered to comprise compounds of the formula $AlR_3$ additional to any $AlR_3$ compound incorporated within the alkylalumoxane when present.

Examples of suitable hydrocarbylboron compounds are boroxines, trimethylboron, triethylboron, dimethylphenylammoniumtetra(phenyl)borate, trityltetra (phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]borate$, trityltetra (pentafluorophenyl)borate and tris(pentafluorophenyl) boron.

An alternative class of activators comprise salts of a cationic oxidising agent and a non-coordinating compatible anion. Examples of cationic oxidising agents include: ferrocenium, hydrocarbyl-substituted ferrocenium, $Ag^+$, or $Pb^{2+}$. Examples of non-coordinating compatible anions are $BF_4^-$, $SbF_6^-$, $PF_6^-$, tetrakis(phenyl)borate and tetrakis (pentafluorophenyl)borate.

The catalysts utilised in the present invention can be unsupported or supported on a support material, for example, silica, alumina, $MgCl_2$ or zirconia, or on a polymer or prepolymer, for example polyethylene, polypropylene, polystyrene, or poly(aminostyrene).

Two or more late transition metal catalyst components can be combined to form the catalyst system utilised in the present invention. Also, in another embodiment of the invention at least one late transition metal catalyst can be combined with a non-late transition metal or traditional Ziegler-Natta catalyst or catalyst system, non-limiting examples are described in U.S. Pat. Nos. 4,701,432, 5,124, 418, 5,077,255 and 5,183,867 all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene or polystyrene divinyl benzene polyolefins or polymeric compounds or any other organic support material and the like, or mixtures thereof.

In one embodiment of the process of the invention, olefin(s), preferably ethylene or propylene or combinations thereof are prepolymerised in the presence of the catalyst or catalyst system of the invention prior to the main polymerisation. The prepolymerisation can be carried out batchwise or continuously in gas, solution or slurry phase including at elevated pressures. The prepolymerisation can take place with any alpha-olefin monomer or combination and/or in the presence of any molecular weight controlling agent such as hydrogen. For details on prepolymerisation see U.S. Pat. Nos. 4,923,833, 5,283,278 and 4,921,825 and EP 279863B all of which are herein fully incorporated by reference.

In another embodiment of the invention, the supported catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the supported catalyst system of the invention includes a polyolefin wax or tackifier or the like.

EXAMPLE 1

Catalyst Preparation

The catalyst used was 2,6-diacetylpyridinebis(2,4,6-trimethylanil)$FeCl_2$ activated with methylaluminoxane (MAO) and supported on silica (Crosfield grade ES70X). The preparation of this catalyst is described in detail in WO 99/46304, the content of which is incorporated herein by reference.

EXAMPLE 2

Polymerisation

The polymerisations were carried out in a fluidised bed gas phase polymerisation reactor consisting of a plenum, a distribution grid, a vertical cylinder of diameter 0.75 m and height 5 m and a velocity reduction chamber. The hot reaction gases exiting the fluidised bed reactor pass through the expanded velocity reduction zone and are recycled to the reactor via a line equipped with a compressor and with a heat transfer means. The cooled recycle gas enters the reactor plenum in the lower part of the reactor vessel and into the fluidised bed consisting of a high density polyethylene powder via the distribution grid. Fresh make-up ethylene, pentane, hydrogen and nitrogen, which represent the main constituents of the gas reaction mixture are introduced into the recycle line.

The gas reaction mixture, which contains ethylene, hexane, hydrogen and nitrogen and other minor components passes through the fluidised bed at a pressure of 2.4 MPa, and with an upward fluidisation velocity of 0.42 m/s.

The polyethylene powder produced is continuously withdrawn to maintain a constant fluidised bed height.

The catalyst used was the catalyst prepared according to Example 1. The catalyst injection rate was set such as to maintain the production rate constant at the desired level.

The operating conditions are shown in Table 1 below.

TABLE 1

| Temp polymerisation | ° C. | 90 |
|---|---|---|
| Partial pressure $C_2H_4$ | bar | 10 |
| $pH_2/pC_2$ | | 0.42 |
| Partial pressure hexane | bar | 0.8 |
| TEA | mmol/hr | 6 |
| Bed Level | m | 5 |
| Fluidisation Velocity | cm/s | 40 |
| Production rate | kg/h | 100 |

$pH_2/pC_2$ = ratio of partial pressure of $H_2$ to partial pressure of ethylene During this operation, cold bands showing a temperature decrease of approximately 3° C. were observed near the bed plate. About 5 hours later, further cold bands showing a temperature decrease of approximately 5.5° C. were observed. This is shown in the accompanying drawings, which show schematically temperature profiles around the edge of the polymerisation reactor. The spots represent the temperature on the surface of the reactor vessel extending 360° around its circumference, and throughout the entire depth of the reactor. Different shading equates to different temperature, as shown on the scale. Thus FIG. 1 shows the appearance of a cold band extending around the base of the reactor, together with some cooler areas at the top of the reactor.

Figure 2:
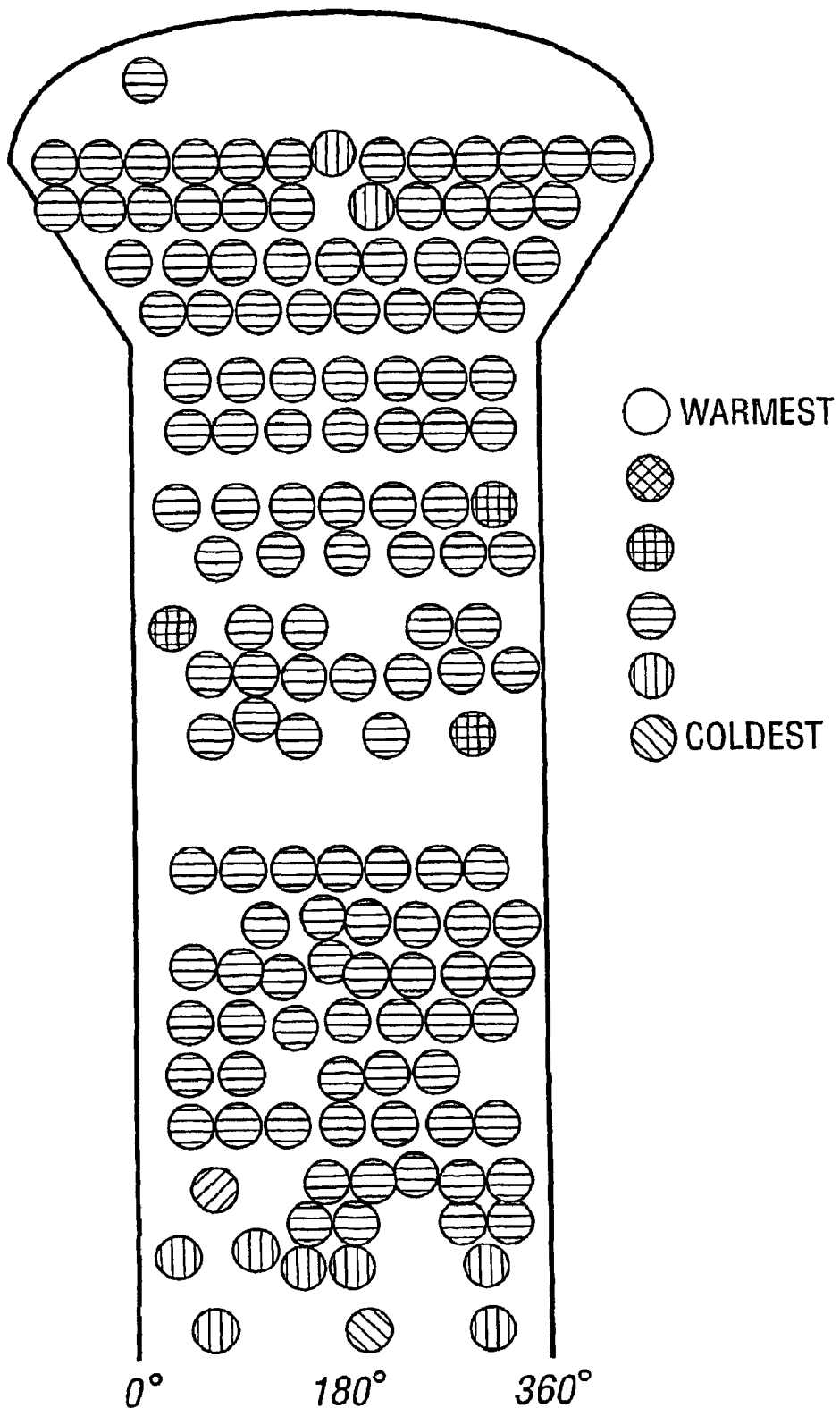
FIG. 2 shows where spots indicating low temperatures have gone, and areas of spots indicating higher temperatures have become more prevalent.

Shortly afterwards, injection of Stadis 425 at a rate of 5 ppm (35 injections per hour of 2.5 cm³ each) was commenced. In due course the cold bands disappeared. This can be seen in FIG. 2, where the spots indicating low temperatures have gone, and areas of spots indicating higher temperatures have become more prevalent.

What is claimed is:

1. Process for the continuous gas-phase (co-)polymerisation of olefins comprising (co-)polymerising one or more olefins in the gas-phase in a polymerisation zone of a fluidised bed reactor using a late transition metal catalyst in the presence of a process aid additive, wherein the additive comprises at least one of the components selected from:
   (1) a polysulfone copolymer,
   (2) a polymeric polyamine, and
   (3) an oil-soluble sulfonic acid.

2. Process according to claim 1 wherein the process aid additive is directly added into the polymerisation zone.

3. Process according to claim 2 wherein the process aid additive is directly added into the fluidised bed polymerisation zone.

4. Process according to claim 2 or 3 wherein the process aid additive is not added in admixture with the catalyst or a cocatalyst.

5. Process according to claim 2 or 3 wherein the addition of the process aid additive is continuous.

6. Process according to claim 1 wherein the process aid additive comprises at least two components selected from components (1), (2) and (3).

7. Process according to claim 6 wherein the process aid additive comprises a mixture of (1), (2) and (3).

8. Process according to claim 1 wherein the process aid additive comprises about 5–70 weight percent polysulfone copolymer, 5–70 weight percent polymeric polyamine, and 5–70 weight percent oil-soluble sulfonic acid.

9. Process according claim 1 wherein the process aid additive represents from 0.3 to 70 parts by weight per million parts by weight of the total olefin introduced into the reactor.

10. Process according to claim 1 wherein the reactor is pre-loaded with the said process aid additive before the late transition metal catalyst is introduced into the reactor.

11. Process according to claim 10 wherein the pre-load is performed solely on seed bed polymer.

12. Process according to claim 1 wherein the process aid additive is selected from STADIS 450 and STADIS 425.

13. Process according to claim 1 wherein the late transition metal catalyst comprises a compound of Formula (I)

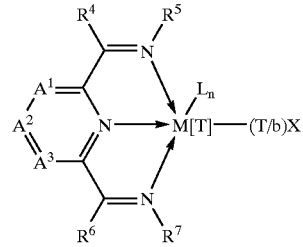

Formula (I)

wherein M is Fe[II], Fe[III], Co[II], Co[III], Ni[II], Rh[II], Rh[III], Ru[II], Ru[III], Ru[IV] or Pd[II]; X represents an atom or group covalently or ionically bonded to the transition metal M; T is the oxidation state of the transition metal M and b is the valency of the atom or group X; L is a group datively bound to M, and n is from 0 to 5; $A^1$ to $A^3$ are each independently N or P or CR, with the proviso that at least one is CR; and R and $R^4$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl and substituted heterohydrocarbyl.

14. Process according to claim 13 wherein the compound of Formula (I) comprise a complex having the formula (II)

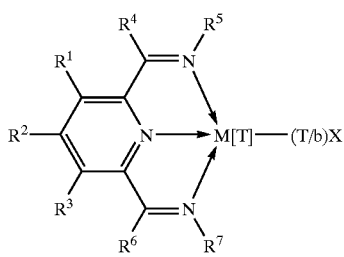

Formula (II)

wherein $R^1$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl, and substituted heterohydrocarbyl.

15. Process according to claim 14 wherein $R^5$ and $R^7$ are independently selected from phenyl, 1-naphthyl, 2-naphthyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl 2-t-butylphenyl, 2,6-diphenylphenyl, 2,4,6-trimethylphenyl, 2,6-trifluoromethylphenyl, 4-bromo-2,6-dimethylphenyl, 3,5 dichloro2,6-diethylphenyl, 2,6,bis(2,6-dimethylphenyl)phenyl, cyclohexyl and pyridinyl.

16. Process according to claim 14 wherein $R^5$ is represented by the group "P" and $R^7$ is represented by the group "Q" as follows:

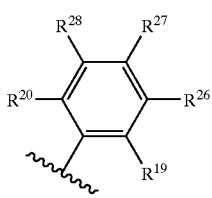

Group P

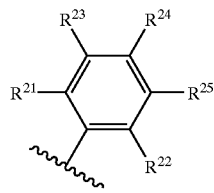

Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

17. Process according to claim 1 wherein a sole or main olefin is either ethylene or propylene, and an optional comonomer is selected from the group consisting of but-1-ene, pent-1-ene, hex-1-ene, 4-methylpent-1-ene and oct-1-ene.

18. Process according to claim 13 wherein the main olefin is ethylene and the optional comonomer is selected from but-1-ene, hex-1-ene or 4-methylpent-1-ene.

19. An ethylene (co)polymer obtained by the process of claim 1.

20. Process according to claim 9 wherein the process aid additive represents from 0.9 to 35 parts by weight per million parts by weight of the total olefin introduced into the reactor.

* * * * *